United States Patent Office 3,778,509
Patented Dec. 11, 1973

3,778,509
CONTROL OF FUNGI ON COTTON PLANTS
Harold Loyd Lewis, Raleigh, N.C., assignor to Cotton, Incorporated, New York, N.Y.
No Drawing. Filed May 28, 1971, Ser. No. 148,178
Int. Cl. A01n 9/24
U.S. Cl. 424—343
11 Claims

ABSTRACT OF THE DISCLOSURE

Monohydric aliphatic alcohols containing from 4 to 12 carbon atoms are effective in the control of microorganisms which cause diseases of plants such as cotton or which produce toxins that impair the usefulness of products of plants intended for human or animal consumption such as cottonseed oil or meal.

BACKGROUND OF THE INVENTION

Microorganisms, including a wide variety of fungi, are responsible for attacking plants such as cotton in a number of ways. For instance, a particularly widespread form of cotton disease is that caused by microbial attack of cotton bolls, resulting in what is commonly known as "boll rot." Boll rot is preceded by sparse growth of vegetative mycelia on the surface of bolls when they are younger than about 35 days. Bolls older than about 35 days become susceptible to attack by the microbes present on their surfaces. The degree of infection depends on temperature and humidity conditions. Once bolls are extensively penetrated, they are rendered essentially useless for textile purposes. Losses due to boll rot often run as high as 15% per annum.

The microorganisms primarily responsible for attacking cotton bolls are reported to be *Fusarium oxysporum, Fusarium roseum, Fusarium moniliforme, Fusarium solani, Verticillium nigrescens, Rhizoctonia solani, Diplodia gossypina, Phytophthora parasitica, Phomopsis gossypii, Collectotrichum gossypii* and *Xanthomonas malvaearum*. Other microorganisms associated with the boll rot complex include *Thielaviopsis basacola, Glomerella gossypii* and *Pythium irregulare*.

In addition, cottonseed meal, which is used as feed for livestock, is a host for a number of species of aflatoxin-producing microorganisms. Aflatoxins have been reported to be responsible for toxicosis in cattle, sheep and swine. See Goldblatt, "Aflatoxin: Scientific Background, Control and Implications," Academic Press, New York, 1969, page 422. Known aflatoxin-producing fungi include various strains of *Aspergillus flavus, Aspergillus oryzae* and *Aspergillus paraciticus*.

Although ethylene dibromide has been effectively used as a soil fumigant in the control of Fusarium, no commercially attractive non-phytotoxic or ecologically acceptable chemical composition has been found which may be applied directly to a crop such as cotton which is effective against all microorganisms causing boll rot and against those producing aflatoxins. For these reasons, cotton growers have continued to search for such chemical control agents.

It is a primary object of the present invention to provide for improved control of microorganisms responsible for diseases in cotton or other field crops. It is a more specific object of this invention to increase the yield of cotton by treating it prior to harvest with a chemical agent which is sufficiently stable to control boll rot over a period ranging from seven days to two months or more depending on environmental conditions. In the event of extended periods of high temperatures and humidity, multiple applications may be needed. The agent thus gives adequate operational flexibility, but has a low persistence in the soil and is biodegradable.

It is another object of this invention to provide an effective fungicide against aflatoxin-producing fungi.

SUMMARY OF THE INVENTION

It has now been discovered that boll rot and other diseases of plants or associated with plants which are caused by microorganisms may be controlled by treating the plants or the susceptible parts thereof, such as cotton bolls, with compositions containing a monohydric alcohol having from 4 to 12 carbon atoms, preferably 6 to 10 carbon atoms in the case of cotton, or mixtures thereof, as an active biocide. In broad compass, the hydrocarbon structure of the alcohol may be linear or branched-chain aliphatic, saturated or unsaturated, or cycloaliphatic. The hydroxyl groups of the alcohol may be attached to a primary, secondary or tertiary carbon atom, but primary alcohols are preferred because they are fungitoxic at lower concentrations. The phytotoxicity of the alcohols toward the cotton plant tends to increase with decreasing alcohol chain length, while fungitoxicity tends to decrease with decreasing chain length, $C_{10}$ being optimum for both high fungitoxicity and low phytotoxicity in the case of cotton.

Besides cotton, plants which can benefit from such treatment include grasses such as corn and other grains, and citrus and other fruit trees. The invention is also useful in the drying and storage of fruit, e.g. in the production of prunes or dried apricots.

The preferred usage form in this invention is an aqueous solution or suspension containing the active compound as the essential active microbial control agent.

Exemplary primary linear alcohols which have been found to be effective as microbial control agents for cotton are 1-hexanol, 1-heptanol, 1-octanol, 1-nonanol and 1-decanol. Branched primary alcohols such as 2-ethylhexanol and the more highly branched alkanols resulting from the oxo process, such as isooctyl and isodecyl alcohols, may also be used but are less desirable because they are less readily biodegradable. 1-decanol is particularly preferred as the active microbiocidal agent, since it exhibits a very high toxicity in very low concentrations to a wide variety of deleterious microorganisms while having low phytotoxicity.

Examples of linear secondary alcohols effective in the present invention include 2-hexanol, 3-hexanol, 2-heptanol, 3-heptanol, 2-octanol, 4-octanol, 2-nonanol, 3-nonanol, 2-decanol, 4-decanol and 5-decanol.

Effective branched chain and tertiary alcohols include 3-methyl-3-pentanol, 3-ethyl-3-hexanol, 3-methyl-3-heptanol, and 3,6-dimethyl-3-octanol.

Ethylenically and acetylenically unsaturated alcohols are also effective fungicides but are not readily biodegradable and are toxic to humans and other mammals. Phenols and cyclic alcohols are not desirable for the same reasons.

Boll rot may be controlled in accordance with this invention by treating the bolls of the cotton plant with one or more of the active alcohols, or with a composition containing one or more of such compounds as its essential active ingredient, at a time when the bolls are from 35 to 45 days old.

Since cotton plants in a given plot may flower over a period as long as 30 to 60 days, it is advantageous to make the first application about 35 to 45 days after first flower depending on location, variety, planting patterns and weather conditions. In this manner, two or three applications will usually suffice to control boll rot in all of the plants in a given field. The second application may be made about 7 to 14 days after the first, and the third application may follow the second by about 7 to 14 days.

The need for as well as the timing of such subsequent applications will depend upon the developmental stage of the bolls and weather conditions.

Each application should cover the entire field or orchard, and the rate of application should be from about 1 to 10 pounds of the active compound per acre of cotton, though higher rates of up to about 12 pounds or more per acre as well as rates as low as about 0.2 pound per acre can be used. The optimum amount will vary somewhat depending on the specific treating composition applied, environmental conditions, time of year, age and size of the cotton or other plants being treated, but can be readily determined for a given case by preliminary testing.

A number of the active cotton disease control compounds of the present invention have also been found to be very effective in the control of the microorganism *Helminthosporum maydis*, which is primarily responsible for the southern leaf blight disease in corn plants. Effective compounds include the linear primary alcohols containing from 6 to 10 carbon atoms. 1-decanol has been found to be especially effective in the control of southern leaf blight when used in treating corn plants according to the same technique herein disclosed as useful in the treatment of cotton.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane.

With the type of boom-spray apparatus used in this work, it is convenient to apply the active compound to the cotton field in the form of an aqueous solution, suspension or emulsion having a concentration of active agent such that the application at the rate of from 50 to 100 gallons of liquid composition per acre will provide the required dosage of active chemical. However, the use of lower or high gallonages may be preferred when a different dispensing mechanism is used.

Water is the preferred liquid carrier for the active biocidal agents in practicing the present invention. Most of the compounds of interest are liquids under normal ambient conditions, though the solid species falling within the scope of the present invention are similarly useful. When water is used as the carrier, from about 0.001 to about 10 percent by weight of a cationic, anionic or nonionic surfactant is generally necessary, both to promote spreading and to reduce phytotoxicity. Preferably the ratio of active alcohol to surfactant is from 10:1 to 1:10. Suitable surfactants include polyoxyethylene sorbitan esters, polyoxyethylene alcohols, alkylarylpolyether alcohols, phthalic glycerol alkyl resins, ethoxylated imidazoline, decanoic acid, diglycol oleate, polyether sulfonates, alkylaryl sulfonates, and mixtures thereof.

A particularly preferred group of surfactants are the polyoxyethylene sorbitan monoesters, such as the laurates, palmitates and oleates. The preferred average number of oxyethylene groups per molecule is about 20, although sorbitan monoesters containing from about 10 to about 30 oxyethylene groups per molecule are similarly useful.

Instead of using water as the carrier, non-phytotoxic mineral oils either as such or in the form of water-in-oil or oil-in-water emulsions may be used similarly in accordance with practices which are common to the art of treating vegetation with beneficial growth control agents.

Other active ingredients, such as known growth control agents and known insecticides, are not required but may be included in the compositions of the present invention in order to obtain a desired result, such as the simultaneous control of boll worms in cotton plants.

Suitable insecticides used for cotton insect control include those registered for use on cotton by the Department of Agriculture. Exemplary compounds include 2-methyl-2-(methylthio)propionaldehyde O-(methylcarbamoyl)oxime, O,O-diethyl phosphorodithioate S-ester with 3-(mercaptomethyl)-1,2,3-benzotriazin-4(3H)-one,
O,O-dimethyl phosphorodithioate S-ester with 3-(mercaptomethyl)-1,2,3-benzotriazin-4(3H)-one,
1-naphthyl methylcarbamate,
S-[[(p-chlorophenyl)thio]methyl] O,O-diethyl phosphorodithioate,
at least 60 percent of 1,2,4,5,6,7,8,8-octachloro-2,3,3a,4,7,7a-hexahydro-4,7-methanoin-dene and not over 40 percent of related compounds,
ethyl 4,4′-dichlorobenzilate,
mixture of O,O-diethyl S(and O)-[2-(ethylthio) ethyl] phosphorothioate,
O,O-diethyl O-(2-isopropyl-4-methyl-6-pyrimidinyl) phosphorothioate,
4,4′-dichloro-alpha-(trichloro methyl)benzhydrol,
3-hydroxy-N,N-dimethyl-cis-crotonamide dimethyl phosphate,
not less than 85 percent of 1,2,3,4,10,10-hexachloro-6,7-epoxy-1,4,4a,5,6,7,8,8a-octahydro-1,4-endo-exo-5,8-dimethanonaphthalene,
O,O-dimethyl S-(N-methylcarbamoylmethyl) phosphorodithioate,
O,O-diethyl S-[2-(ethylthio)ethyl] phosphorodithioate,
6,7,8,9,10,10-hexachloro-1,5,5a,6,9,9a-hexahydro-6,9-methano-2,4,3-benzodioxathiepin 3-oxide,
1,2,3,4,10,10-hexachloro-6,7-epoxy-1,4,4a5,6,7,8,8a-octahydro-1,4-endo-endo-5,8-dimethanonaphthalene,
O-ethyl-O-p-nitrophenyl phenylphosphonothioate,
O,O,O′,O′-tetraethyl S,S′-methylenebisphosphorodithioate,
S-[1,2-bis(ethoxycarbonyl)ethyl] O,O-dimethyl phosphorodithioate,
O,O-dimethyl O-p-nitrophenyl phosphorothioate,
S-[[(p-chlorophenyl)thio]methyl] O,O-dimethyl phosphorodithioate,
3-hhydroxy-N-methyl-cis-crotonamide dimethyl phosphate,
1,2-dibromo-2,2-dichloroethyl dimethyl phosphate,
O,O-diethyl O-p-nitrophenyl phosphorothioate,
O,O-diethyl S-[(ethylthio)methyl] phosphorodithioate,
2-chloro-2-diethylcarbamoyl-1-methylvinyl dimethyl phosphate,
terpene polychlorinates containing 65 percent chlorine, sulfur, chlorinated camphene containing 67 to 69 percent chlorine, and dimethyl (2,2,2-trichloro-1-hydroxyethyl)phosphonate.

Such insecticides are preferably included in a composition containing the active fungicidal compound in an amount such that between about 0.25 and 5 pounds per acre are applied. For example, the insecticide comprising terpene polychlorinates containing 65 percent chlorine (commonly known as "Toxaphene") should be used in an amount from about 1 to about 4 pounds per acre. Dimethyl - (2,2,2 - trichloro - 1 - hydroxyethyl)phosphonate (commonly known as "Trichlorfon") may be included in the fungicidal composition in an amount so that from about 1 to about 3 pounds per acre are applied.

The insecticides O,O-dimethyl phosphorodithioate S-ester with 3-(mercaptomethyl)-1,2,3-benzotriazin-4(3H)-one (sold by Bayer as "Guthion"), 1-napthyl methylcarbamate (sold by Union Carbide as "Sevin"), 3-hydroxy-N-methyl-cis-crotonamide dimethyl phosphate (sold under the tradename "Azodrin" by Shell Oil Co.), and O,O-dimethyl - O - p - nitrophenyl phosphorothioate (commonly known as "Methyl Parathion") are especially useful for the control of the pink boll worm in cotton plants, which aggravates the boll rot problem. "Guthion" should be applied in an amount from about 0.15 to about 2, preferably from about 0.25 to 1 pound per acre, while "Sevin" may be applied in an amount from about 0.25 to 4, preferably from about 0.5 to 3 pounds per acre. "Azodrin" is most effective in an amount from about 0.15 to 2, preferably 0.3 to 1 pound per acre. The insecticide "Methyl Parathion" is effective against the pink boll worm and other insects when applied in an amount from about 0.15 to 4, preferably from about 0.25 to 3 pounds per acre.

Phytotoxicity of some of the active alcohols is in general low. For example, concentrations as high as 3% of 1-octanol, 1-decanol and mixtures thereof have no adverse effect upon seedling germination. Although the compounds of the present invention have been known to exhibit a selectivity for the removal of the meristems of various plants, and may therefore be useful as chemical prunning agents when desired, this effect may be diminished or blocked altogether by choosing a suitable alcohol species or by maintaining a low alcohol to surfactant ratio.

DESCRIPTION OF SPECIFIC EMBODIMENTS

Examples 1–9

Gradient plates containing a Saboraud's nutrient agar (a glucose peptone medium) were prepared according to the Szybalski method and inoculated with 1 to 2 ml. of a spore inoculum containing $1 \times 10^5$ spores/ml. of the microorganisms indicated in Table I. The proper amount of a filter sterilized alcohol was blended into a known volume of molten agar medium under sterile conditions to yield the desired concentration ranging from 0.03 to 1% as indicated, and allowed to incubate for a period up to 14 days at 25° to 28° C., intermittent readings being taken to observe if any growth had taken place. The growth in all cases was essentially zero at the concentrations indicated in Table I.

TABLE I

| Alcohol | Concentration (percent) | Microorganism |
|---|---|---|
| Example Number: | | |
| 1 ......... 1-hexanol ......... | 1.0 | Fusarium oxysporum. |
| | .03 | Fusarium moniliforme. |
| | .03 | Diplodia gossypina. |
| | .03 | Xanthomonas malvaccarum.[1] |
| 2 ......... 1-hexyn-3-ol ......... | 0.1 | Fusarium oxysporum. |
| 3 ......... 2-heptanol ......... | 1.0 | Fusarium solani. |
| | .03 | Fusarium solani. |
| | .03 | Rhizoctonia solani. |
| 4 ......... 1-octanol ......... | .03 | Collectotrichum gossypina. |
| | .03 | Pythium irregulea. |
| 5 ......... 1-ethynyl-1-cyclohexanol ... | .25 | Fusarium oxysporum. |
| 6 ......... 2-nonanol ......... | 1.0 | Fusarium solina. |
| | .03 | Fusarium oxysporum. |
| | .03 | Verticillium nigrescens. |
| 7 ......... 1-decanol ......... | .03 | Glomerella gossypina. |
| | .03 | Helmnthosporum maydis. |
| | .03 | Thielaviopsis basacola. |
| 8 ......... 3,6-dimethyl-3-octanol ... | .01 | Fusarium oxysporum. |
| 9 ......... 4-ethyl-1:hexyn-3-ol ... | 0.1 | Fusarium oxysporum. |

[1] $1 \times 10$ spores/ml. inoculum.

Examples 10–15

Gradient plates of the type set forth in Examples 1–9 were prepared and inoculated in the same manner as in Examples 1–9 with aqueous solutions of alcohols additionally containing a surfactant of polyoxyethylene sorbitan monooleate (sold by Atlas Powder Company under the tradename "Tween 80") for all but Examples 14 and 15, which were polyoxyethylene sorbitan monolaurate ("Tween 20") in the concentration indicated in Table II. The percentage growth of the microorganisms indicated was essentially zero.

TABLE II

| Example number | Alcohol | Alcohol concentration (percent) | Alcohol surfactant ratio | Microorganism |
|---|---|---|---|---|
| 10 | 1-octanol | 0.50 | 1:2 | Fusarium solani. |
| 11 | do | 0.50 | 1:1 | Fusarium solani. |
| 12 | 45% 1-octanol, 55% 1-decanol | 0.10 | 1:1.7 | Thielaviopsis basacola. |
| 13 | do | 0.01 | 1:1.7 | Thielaviopsis basacola |
| 14 | do | 0.03 | 1:2 | Fusarium solani. |
| 15 | do | 0.03 | 1:8 | Fusarium solani. |

Examples 16–18

The following examples illustrate the inhibitory effect that the active alcohols exert upon aflatoxin-producing microorganisms. Gradient plates prepared as in Examples 1–9 were injected with various strains of Aspergillus spp., which are known aflatoxin-producing fungi (numbers refer to the Northern Regional Research Laboratory culture collection). The pates were also injected as in Examples 1–9 with various alcohols at the concentrations and pH indicated in Table III. The percentage growth of all of the strains tested was essentially zero.

TABLE III

| Alcohol | Concentration (percent) | pH | Aspergillus strain |
|---|---|---|---|
| Example number: | | | |
| 16 ......... 1-hexanol ......... | 1.0 | 5.0 | A. flavus 3517. |
| | 1.0 | 7.0 | A. oryzae 466. |
| | 1.0 | 8.0 | A. flavus 1957. |
| | 1.0 | 6.0 | A. flavus 482. |
| 17 ......... 1-octanol ......... | 0.03 | 7.0 | A. flavus 3518. |
| | 0.03 | 8.0 | A. parasiticus 2999. |
| | 0.03 | 5.0 | A. parasiticus 502. |
| 18 ......... 1-decanol ......... | 0.03 | 7.0 | A. oryzae 447. |
| | 0.03 | 8.0 | A. flavus 3517. |

The results show that the alcohols are effective against a broad range of known aflatoxin-producing microorganisms and are relatively independent of the normal pH found on most plants.

Example 19

A mixture of 45% n-octanol and 55% n-decanol as active ingredients was applied to 2 acres of American upland cotton plants when about 50% of the bolls were 35 days old by means of a commercial spraying. The alcohols were present in a concentration of 1% in an aqueous suspension containing 0.6% of a polyethoxylated sorbitan monooleate ("Tween 80"). The rate of application was 74 gallons per acre, and one application was made.

The treated plot exhibited an increase in yield of about 10% as compared to an untreated control plot of the same acreage.

The invention described above is particularly pointed out in the following claims, it being understood that it may be varied or modified in ways that may occur to those skilled in the art, without departing from the scope or spirit hereof.

I claim:

1. A method for the control of *Fusarium oxysporum* on cotton plants which comprises treating said cotton plants with a fungicidally effective amount of a monohydric aliphatic alcohol containing from 6 to 10 carbon atoms per molecule.

2. A method for the control of *Xanthomonas malvaciarum* on cotton plants which comprises treating said cotton plants with a fungicidally effective amount of a monohydric aliphatic alcohol containing from 6 to 10 carbon atoms per molecule.

3. A method for the control of *Collectotrichum gossypii* on cotton plants which comprises treating said cotton plants with a fungicidally effective amount of a monohydric aliphatic alcohol containing from 6 to 10 carbon atoms per molecule.

4. A method for the control of *Thielaviopsis basacola* on cotton plants which comprises treating said cotton plants with a fungicidally effective amount of a monohydric aliphatic alcohol containing from 6 to 10 carbon atoms per molecule.

5. A method for the control of *Fusarium solani* on cotton plants which comprises treating said cotton plants with a fungicidally effective amount of a monohydric aliphatic alcohol containing from 6 to 10 carbon atoms per molecule.

6. A method for the control of *Diplodia gossipina* on cotton plants which comprises treating said cotton plants with a fungicidally effective amount of a monohydric aliphatic alcohol containing from 6 to 10 carbon atoms per molecule.

7. A method for the control of *Rhizoctonia solani* on cotton plants which comprises treating said cotton plants with a fungicidally effective amount of a monohydric aliphatic alcohol containing from 6 to 10 carbon atoms per molecule.

8. A method for the control of *Aspergillus flavus* on cotton plants which comprises treating said cotton plants with a fungicidally effective amount of a monohydric aliphatic alcohol containing from 6 to 10 carbon atoms per molecule.

9. A method according to claim 1 wherein said alcohol is applied at a rate of from about 1 to about 10 pounds of the alcohol per acre.

10. A method according to claim 9 wherein said alcohol is applied to the cotton plants as an aqueous suspension of from about 0.01 to about 1% by weight of the alcohol and from about 99 to about 99.99% by weight water.

11. A method according to claim 10 wherein said suspension further contains from about 0.001% to 10% by weight of a surfactant.

References Cited

UNITED STATES PATENTS

| | | | |
|---|---|---|---|
| Re. 20,869 | 10/1938 | Bousquet et al. | 424—343 |
| Re. 20,869 | 10/1938 | Bousquet et al. | 424—343 |
| 1,920,026 | 7/1933 | Tischler | 424—343 |
| 2,254,665 | 9/1941 | Ralston et al. | 424—343 |

FOREIGN PATENTS

| | | | |
|---|---|---|---|
| 1,693,734 | 3/1934 | Australia | 424—343 |
| 237,408 | 8/1911 | Germany | 424—343 |
| 565,473 | 11/1944 | Great Britain | 424—343 |
| 1,693,734 | 3/1934 | Australia | 424—343 |

ALBERT T. MEYERS, Primary Examiner

D. W. ROBINSON, Assistant Examiner